Figure 2:
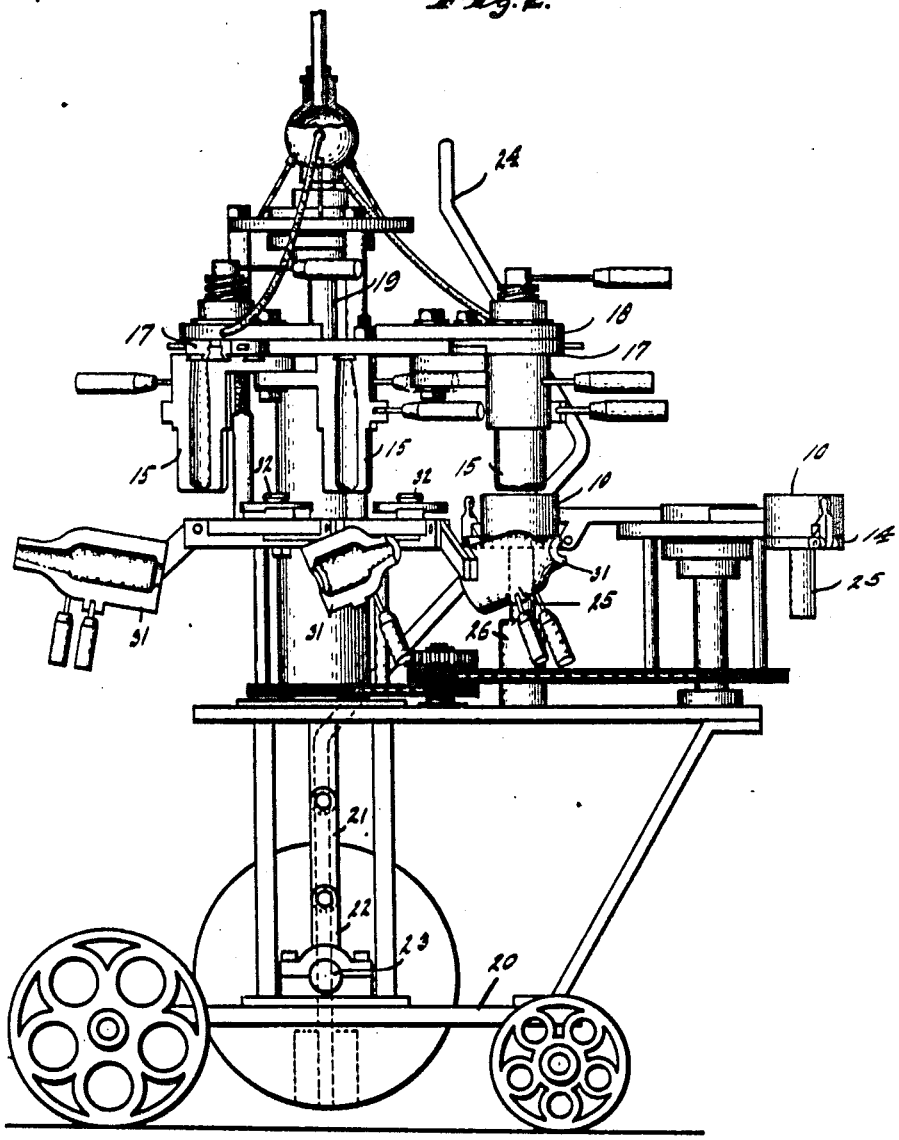

M. K. HOLMES.
GLASS WORKING.
APPLICATION FILED NOV. 22, 1912.
1,133,244.
Patented Mar. 23, 1915.
2 SHEETS—SHEET 1.
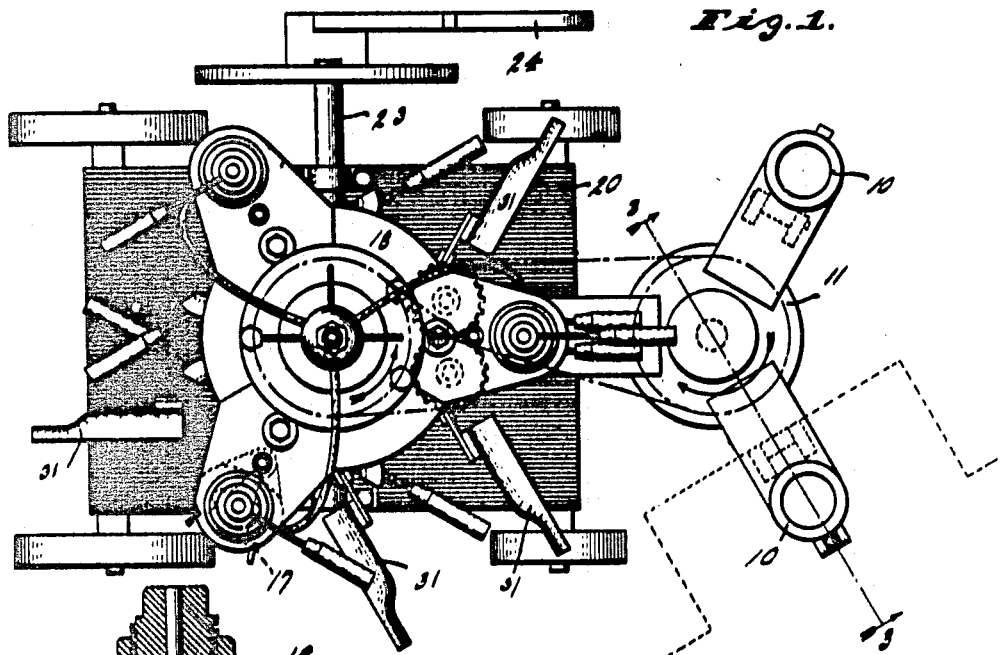
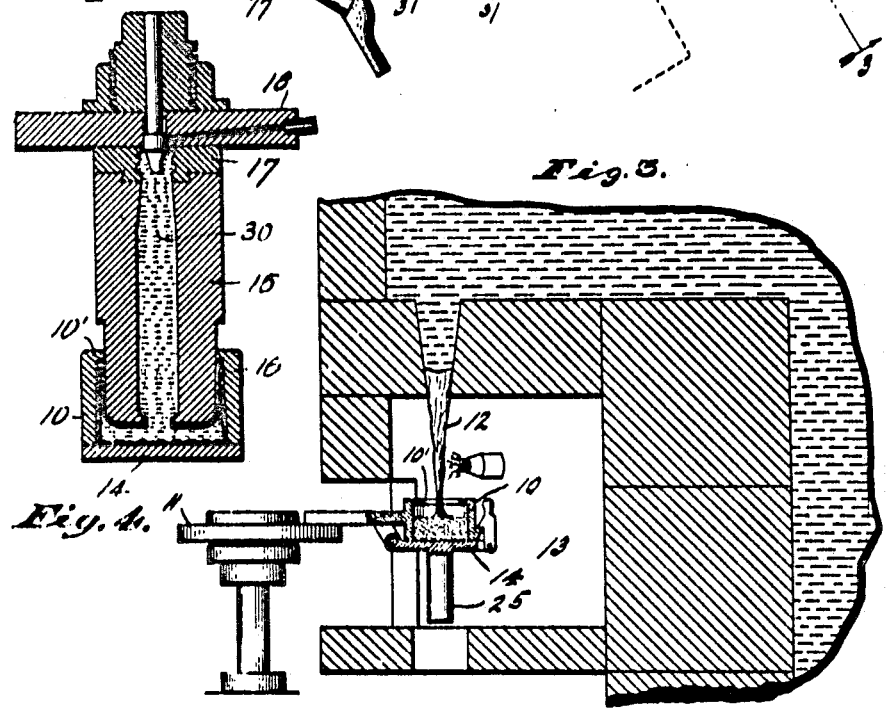
Witnesses
Frank A. Fihle
Josephine Gasper
Inventor
Minot K. Holmes,
Arthur W. Good
Attorney

M. K. HOLMES.
GLASS WORKING.
APPLICATION FILED NOV. 22, 1912.

1,133,244.

Patented Mar. 23, 1915.
2 SHEETS—SHEET 2.

Witnesses
Frank A. Fahle
Josephine Gasper

Inventor
Minot K. Holmes,
by Arthur M. Hood
Attorney

U N I T E D   S T A T E S   P A T E N T   O F F I C E.

MINOT K. HOLMES, OF MUNCIE, INDIANA, ASSIGNOR TO HEMINGRAY GLASS COMPANY, OF MUNCIE, INDIANA, A CORPORATION OF KENTUCKY.

GLASS-WORKING.

1,133,244.	Specification of Letters Patent.	Patented Mar. 23, 1915.

Application filed November 22, 1912. Serial No. 732,619.

*To all whom it may concern:*

Be it known that I, MINOT K. HOLMES, a citizen of the United States, residing at Muncie, in the county of Delaware and State of Indiana, have invented a new and useful Improvements in Glass-Working, of which the following is a specification.

It has heretofore been proposed to deliver a small charge of molten glass from a furnace to a preliminary receptacle and to thereafter mechanically deliver some or all of such charge into a forming mold, either for the purpose of immediately producing a finished article, or for producing a parison which, in turn, would be blown to desired shape. In practice it has been found that, immediately upon the deposit of a limited charge of molten glass in a receptacle there is formed a chilled skin wherever contact has been had with the receptacle and that this chilled skin can not be radically or suddenly deformed and that the entire charge can not be, with commercial success, delivered into a parison mold in such condition as to be fit for a subsequent manipulation by blowing.

The object of my present invention is, therefore, to provide a new mode of procedure, and, incident thereto new coöperating mechanism, by which forming molds may be charged with molten glass (preferably that which has been delivered directly from a furnace or large supply pool) which has not come into contact with any other structure.

The accompanying drawings illustrate, somewhat diagrammatically, a mechanism by means of which my invention may be practised.

Figure 1 is a plan of a manually operated machine; Fig. 2 a side elevation; Fig. 3 a fragmentary vertical section showing the manner of automatic delivery of molten glass from the furnace to a charge-receptacle; Fig. 4 a vertical section showing the association of filled charge-receptacle with a primary mold.

Except for the peculiarity of relationship between the charge-receptacle and the primary mold the details of mechanism, and whether their manipulation be manual or mechanical, semi-automatic or automatic, are immaterial and it should be understood that I have, in the drawings of this application, illustrated a very simple form of hand-operated machine because the production of an automatic machine by the use of well known forms of mechanism in combination with my improvements, will be well within the range of skill of the average mechanic familiar with glass working machinery.

In the drawings 10 indicates any one of a series of charge-receptacles carried by a rotary table 11 and arranged to come successively under a stream of molten glass 12 conveniently flowing continuously from the furnace. (No stream cutting mechanism need necessarily be provided because, when the table 11 is moved the stream will merely hang from one receptacle to the next and either break of its own weight or by means of the heat of chamber 13 in which the delivery conveniently takes place.) Each charge receptacle 10 is conveniently larger at its lower end and provided with a movable bottom 14. The upper end of receptacle 10 is so formed as to freely receive the lower end of the primary mold 15, the difference in diameter being such that there will be ample room for the chilled skin 16 of the molten glass to lie between receptacle and mold and also such that the glass cannot be squeezed out of the top of the receptacle to an extent sufficient to interfere with the proper delivery of the molten glass into the primary mold. The last condition can be accomplished by bringing the upper end of the receptacle near enough to the primary mold, either by an overhanging flange 10' or otherwise.

Any suitable means may be provided to bring the filled charge-receptacle and the primary mold together, and in the drawings I have shown a plurality of such molds, together with coacting neck-molds 17, mounted on a rotary head 18 carried by a vertically movable shaft 19 which is supported on the same base 20 which supports table 11. Shaft 19 is vertically reciprocated by links 21, crank 22, shaft 23 and hand lever 24.

When a charge container, with its molten glass, arrives at the pressing position the depending pin 25 of bottom 14 rests upon anvil 26 and by that time a skin 16 will have formed around all of the charge of molten glass except the top, and when the mold 15 is projected into the molten metal it will extend the formation of this chilled skin across all of the touched portions of the top of the charge but, because the mold 15 is of materially less diameter than the charge-receptacle, there is no tendency, during the further projection of the mold, to drive this skin into the mold. On the contrary the skin remains in contact with the exterior of the mold and the interior of the receptacle and virgin glass is squeezed up into the mold.

The necessary pressure for any height of object is obtained either by the resistance of the chilled and doubled skin 16 which lies between mold and receptacle, or by the flange 10'.

When the primary mold has been filled it is withdrawn from the receptacle and the surplus glass cut from the lower end of the mold by any suitable means, a hand manipulated knife being sufficient. Then the primary mold (conveniently an ordinary hinged section mold) may be withdrawn from the parison 30 and blow-mold sections 31 and bottom 32—also carried by head 18,—may be brought into place for further manipulation of the parison. Bottom 14 will then be opened, the surplus glass in receptacle 10 discharged to be remelted, and the operation repeated.

I claim as my invention:

1. That improvement in the art of glass working which consists in depositing a charge of molten glass within a receiver and in thereafter bringing the charged receiver and the open end of a mold together so as to submerge the open mold-end while maintaining a portion of glass between the receiver and the submerged portion of the mold and preventing movement of that portion of glass toward the interior of the mold.

2. In glass working, the combination of a charge-receiver and an open-ended mold, said mold having its open end submergible in molten glass contained in the receiver, said end being of an external diameter less than the internal diameter of the glass-holding portion of the receiver by an amount sufficient to accommodate the chilled skin of the glass formed by contact with the receiver and mold, the receiver and mold being so formed as to prevent material ejection of glass from the receiver and to produce ejection of the center of the molten glass into the mold by reason of submergence of the receiving end of the mold.

3. In glass working, the combination of a charge-receiver and an open-ended mold, said mold having its open end submergible in molten glass, contained in the receiver, through an open end of the receiver having a diameter sufficiently approximating the external diameter of the mold to prevent material outflow of glass there-between while accommodating the chilled skin of glass between the container and exterior of the submergible portion of the mold, whereby flow of glass from the container into the mold will take place during submergence of the open end of the mold.

In witness whereof, I have hereunto set my hand and seal at Muncie, Indiana, this 19th day of November, A. D. one thousand nine hundred and twelve.

MINOT K. HOLMES. [L. S.]

Witnesses:
EVAN L. KUNE,
BENJ. H. WHITE.